US008515098B2

(12) United States Patent
Liu

(10) Patent No.: US 8,515,098 B2
(45) Date of Patent: Aug. 20, 2013

(54) NOISE SUPPRESSION DEVICE AND NOISE SUPPRESSION METHOD

(75) Inventor: Encai Liu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 885 days.

(21) Appl. No.: 12/605,291

(22) Filed: Oct. 23, 2009

(65) Prior Publication Data

US 2010/0104113 A1 Apr. 29, 2010

(30) Foreign Application Priority Data

Oct. 24, 2008 (JP) ................................ 2008-274939

(51) Int. Cl.
*H04B 15/00* (2006.01)
*G10L 21/02* (2006.01)

(52) U.S. Cl.
USPC .......................................... 381/94.1; 704/226

(58) Field of Classification Search
USPC .............. 381/94.1, 94.2, 94.3; 704/214, 215, 704/226, 227, 233
See application file for complete search history.

(56) References Cited

U.S. PATENT DOCUMENTS

| | | | | |
|---|---|---|---|---|
| 5,572,621 | A | 11/1996 | Martin | |
| 2004/0049383 | A1 | 3/2004 | Kato et al. | |
| 2008/0010063 | A1 | 1/2008 | Komamura | |
| 2009/0164212 | A1* | 6/2009 | Chan et al. | 704/226 |
| 2010/0198593 | A1* | 8/2010 | Yu | 704/233 |

FOREIGN PATENT DOCUMENTS

| | | | |
|---|---|---|---|
| JP | 2006-126859 | | 5/2006 |
| KR | 10-2006-0053022 | A | 5/2006 |
| WO | WO-2006/070560 | A1 | 7/2006 |

OTHER PUBLICATIONS

Boll, Steven F. (Apr. 1979). "Suppression of Acoustic Noise in Speech Using Spectral Subtraction," *IEEE Transactions on Acoustics, Speech, and Signal Processing* ASSP27(2):113-120.

Doblinger, Gerhard. "Computationally Efficient Speech Enhancement by Spectral Minima Tracking in Subbands," *Proc. Of Eurospeech*, 95: 1513-1516.

Korean Office Action mailed Mar. 3, 2011, for KR Application No. 10-2009-101105, with English Translation, 19 pages.

* cited by examiner

*Primary Examiner* — Duc Nguyen
*Assistant Examiner* — Kile Blair
(74) *Attorney, Agent, or Firm* — Morrison & Foerster LLP

(57) ABSTRACT

In a noise suppression device, an audio detector detects presence or absence of audio in an input signal. A first noise spectrum estimator estimates a noise spectrum contained in the input signal based on the input signal and detection result of the audio detector. A second noise spectrum estimator estimates the noise spectrum based on the input signal regardless of the detection result of the audio detector. A noise spectrum calculator calculates a final noise spectrum estimation value according to a length of detecting time during which the audio detector continuously detects the audio and based on first and second noise spectrum estimation values that are obtained as estimation results by the first and second noise spectrum estimators. A gain calculator calculates a noise suppression gain based on the final noise spectrum estimation value. A noise suppressor suppresses noise contained in the input signal by applying the noise suppression gain to the input signal.

8 Claims, 6 Drawing Sheets

NOISE SUPPRESSION DEVICE AND NOISE SUPPRESSION METHOD

BACKGROUND OF THE INVENTION

1. Technical Field of the Invention

The present invention relates to a noise suppression device and a noise suppression method.

2. Description of the Related Art

A variety of audio devices have been developed, including an audio playback device that drives load such as speakers or the like according to an input signal, a voice communication device used for voice communication between remote places, and a voice recognition device that determines the meaning of voice by identifying and recognizing the type or the like of the voice. To allow each of these devices to correctly reproduce, transmit, or recognize audio, it is preferable to remove the influence of noise contained in the audio.

Examples of such noise suppression technologies include those described in the following Patent References 1 and 2 and Non-Patent References 1 and 2.

[Patent Reference 1] Patent Application Publication No. 2006-126859

[Patent Reference 2] U.S. Pat. No. 5,572,621

[Non-Patent Reference 1] Boll, S., "Suppression of acoustic noise in speech using spectral subtraction", IEEE Trans. Vol. ASSP-27, No. 2, pp. 113-120, 1979.

[Non-Patent Reference 2] Doblinger G., "Computationally efficient speech enhancement by spectral minima tracking in subbands", Proc. of Eurospeech EUROSPEECH'95, pp. 1513-1516.

Technologies described in these references relate to a so-called spectral subtraction method in which noise is suppressed through subtraction from the level of an amplitude spectrum of the frequency domain of input signal using an appropriate technique. These technologies all achieve certain noise suppression effects.

However, these references have undisclosed or unsolved problems.

For example, the spectral suppression method is based on a scheme in which a noise spectrum contained in an input signal is estimated and the noise spectrum estimation value is subtracted from an amplitude spectrum. In this case, there is a problem in that it is difficult to secure the accuracy of the noise spectrum estimation value. That is, since the noise spectrum estimation value is just an estimation, it does not necessarily reflect the actual noise spectrum. As a result, suppression may be performed insufficiently at positions at which more suppression should be performed or, conversely, suppression may be performed excessively at positions at which suppression should not be performed. Thus, the spectral suppression method has a problem in that it is not possible to achieve correct noise suppression.

Patent Reference 1 suggests a method which detects whether or not audio is contained in an input signal and estimates the average spectrum of an interval including no audio as a noise spectrum. Patent Reference 2 and Non-Patent Reference 2 suggest a method in which a noise spectrum is estimated directly from an input signal without performing audio detection.

However, basically, none of the references provide a means for certainly overcoming the above problems since the noise spectrum is still just an "estimation" in all of the references.

In addition, each of the references individually has the following problems. First, in Patent Reference 2, a minimum value is found among values obtained by smoothing the spectrum of an input signal within a limited time window and the found minimum value is used as a noise spectrum. However, this method has a problem in that the capacity of storage for storing the spectrum is relatively large and the amount of calculation for obtaining the minimum value is also great.

In Patent Reference 2, since a noise spectrum is estimated using the minimum value, there is a tendency to underestimate a noise spectrum value in the case where the input signal includes only noise. For the same reason, in the case where the input signal includes an audio signal, there is a tendency to overestimate a noise spectrum value even though the minimum value is used. In the former case, noise that is little suppressed is output and, in the latter case, there is a problem of sound quality degradation due to excessive subtraction of noise spectrum. Non-Patent Reference 2 also has these problems.

Patent Reference 1 has a problem in that it is not necessarily possible to cope well with the case where the level of noise rapidly changes. That is, in Patent Reference 1, in the case where the level of the input signal has rapidly changed, the noise spectrum estimation value is not updated, assuming that the signal should have contained audio. However, there is a problem if the rapidly changed level is not associated with audio (namely, signal), but associated with a noise. If this situation continues, the noise spectrum estimation value is also not updated, causing a problem in that noise with the rapidly changed level is retained and reproduced.

SUMMARY OF THE INVENTION

One object of the invention is to provide a noise suppression device and a noise suppression method that can overcome at least one of the problems described above.

To achieve the above object of the invention, a noise suppression device according to the invention comprises an audio detector that detects presence or absence of audio in an input signal, a first noise spectrum estimator that estimates a noise spectrum contained in the input signal based on the input signal and detection result of the audio detector, thereby obtaining a first noise spectrum estimation value, a second noise spectrum estimator that estimates the noise spectrum based on the input signal regardless of and independently from the detection result of the audio detector, thereby obtaining a second noise spectrum estimation value, a noise spectrum calculator that calculates a final noise spectrum estimation value according to a length of detecting time during which the audio detector continuously detects the audio and based on the first and second noise spectrum estimation values that are obtained as estimation results by the first and second noise spectrum estimators, a gain calculator that calculates a noise suppression gain based on the final noise spectrum estimation value, and a noise suppressor that suppresses noise contained in the input signal by applying the noise suppression gain to the input signal.

According to the invention, the first and second noise spectrum estimators obtain the first-noise spectrum estimation value based on the detection result of the audio detector and obtains the second noise spectrum estimation value that is not associated with the detection result. The first noise spectrum estimation value has high reliability since it is an estimation value based on the audio detection and is highly likely to be more effective in terms of noise suppression effects since a noise spectrum to be used can be selected (and thus a noise suppression processing mode can be selected) according to presence or absence of an audio signal. On the other hand, although the second noise spectrum estimation value has minimal noise suppression effects, it can be estimated based only on the input signal and therefore it is highly likely to very closely and quickly follow changes of the level of input signal.

In the case of using only the first noise spectrum estimation value, it is difficult to effectively suppress noise when the level of the noise has rapidly increased as described above and, in the case of using only the second noise spectrum estimation value, the noise spectrum may be underestimated or overestimated.

However, in the invention, the noise spectrum calculator calculates the final noise spectrum estimation value according to the length of detecting time during which the audio is continuously detected.

Here, the term "length of detecting time" refers to a duration during which audio is continuously detected. However, taking into consideration the fact that the possibility that the duration of an audio signal contained in the input signal is very long is significantly low because persons actually need to take breaths when they speak, there is a possibility that the time during which "audio" is detected includes a time during which "noise" alone is present, i.e., there is a possibility that the detection of "audio" is merely detection of an "increase in the noise level". Rather, it is estimated that such a possibility will increase as the "length of detecting time" increases.

The invention appropriately copes with such a case. That is, the invention copes with such a case by calculating the "final noise spectrum estimation value" according to the "length of detecting time" as described above. For example, in the case where the length of detecting time is very long, the final noise spectrum estimation value is calculated by increasing the influence of the second noise spectrum estimation value to thereby effectively suppress noise since there is a possibility that the input signal is only a noise signal although the time of "audio" detection is continued.

In any case, according to the invention, it is possible to select one of a variety of usage modes, including simple usage forms, of the first and second noise spectrum estimation values according to the "length of detecting time", and therefore it is possible to calculate the final noise spectrum estimation value based on considerations such that the merits described above in association with the first noise spectrum estimation value are obtained (or the demerits thereof are suppressed) in some cases and the merits described above in association with the second noise spectrum estimation value are obtained (or the demerits thereof are suppressed) in some cases.

In the noise suppression device according to the invention, the noise spectrum calculator may include a factor calculation unit that calculates a weighting factor by which the first and second noise spectrum estimation values are to be multiplied, the weighting factor having a value varying according to the length of detecting time, and the noise spectrum calculator may calculate the final noise spectrum estimation value by calculating a weighted average of the first and second noise spectrum estimation values using the weighting factor.

In this aspect, the calculation of the final noise spectrum estimation value is performed appropriately.

Specifically, since the "weighted average" is obtained using the "weighting factor" according to the length of detecting time during which audio is continuously detected, the advantages of the invention described above, i.e., the advantages in that the merits of the first and second noise spectrum estimation values are obtained and the demerits are suppressed, can be achieved in an "overlapping" manner. Here, qualitatively speaking, the term "overlapping manner" indicates that the final noise spectrum estimation value which is influenced by both the first and second noise spectrum estimation values is calculated in order to achieve the merits of the first and second noise spectrum estimation values half and half. The same is true for the following description.

In the noise suppression device according to the invention, the noise spectrum calculator may include an integrator that operates according to the length of detecting time, that uses the first noise spectrum estimation value as an initial value, and that is activated upon receiving the second noise spectrum estimation value.

According to this aspect, the calculation of the final noise spectrum estimation value is performed appropriately.

Specifically, in this aspect, since the integrator is included, it is possible to realize, for example, continuous transition from the first noise spectrum estimation value to the second noise spectrum estimation value according to the length of detecting time. This aspect also achieves the advantages of the invention described above in such an overlapping manner.

In the noise suppression device according to the invention, the noise spectrum calculator may calculate the first noise spectrum estimation value directly as the final noise spectrum estimation value when the length of detecting time is equal to or less than a first predetermined value, may calculate the second noise spectrum estimation value directly as the final noise spectrum estimation value when the length of detecting time is equal to or greater than a second predetermined value, and may calculate an intermediate noise spectrum estimation value between the first and second noise spectrum estimation values as the final noise spectrum estimation value when the length of detecting time is greater than the first predetermined value and less than the second predetermined value.

According to this aspect, the calculation of the final noise spectrum estimation value is performed appropriately.

Specifically, in this aspect, since the final noise spectrum estimation value is calculated according to the magnitude relation between the length of detecting time and each predetermined value, it is possible to appropriately cope with, for example, the case where "audio" is erroneously detected as described above.

In addition, the concept of "intermediate noise spectrum estimation value" used in this aspect indicates not only a constant that can assume only one value but also a set of numbers which have continuous values as described later and may also indicate a set of numbers that have stepwise values in some cases. Strictly speaking, the term "intermediate" also does not refer to a middle point, which is on a line segment connecting the first and second noise spectrum estimation values and which is equidistant from the first and second noise spectrum estimation values.

In the noise suppression device according to the invention, the intermediate noise spectrum estimation value may have a value varying according to the length of detecting time so as to transition between the first and second noise spectrum estimation values.

According to this aspect, the intermediate noise spectrum estimation value is characterized appropriately. However, since, in this case, the "intermediate noise spectrum estimation value" is defined as a value used when the "length of detecting time" is greater than the first predetermined value and less than the second predetermined value as described above, in this aspect, the lower limit of the "length of detecting time" in the case where the intermediate noise spectrum estimation value has a value varying according to the length of detecting time is the first predetermined value and the upper limit is the second predetermined value.

Therefore, the "intermediate noise spectrum estimation value" of this aspect is assumed to be a value (or a group of values) continuously changing between the first noise spectrum estimation value applied when the length of detecting time is equal to or less than the first predetermined value and the second noise spectrum estimation value applied when the length of detecting time is equal to or greater than the second predetermined value. This "intermediate noise spectrum estimation value" can be considered a value that appropriately combines the properties of the first and second noise spectrum estimation values.

Accordingly, this aspect also achieves the advantages of the invention described above in such an overlapping manner.

In the noise suppression device according to the invention, the audio detector may detect presence or absence of audio in the input signal for a part belonging to a predetermined frequency band in the input signal.

According to this aspect, it is possible to more accurately perform audio detection or to improve the speed of calculation associated with audio detection or the like since the "frequency band" mentioned in this aspect may include, for example, a frequency band that is strongly predicted to include audio.

To achieve the above object of the invention, a noise suppression method according to the invention includes an audio detection process for detecting presence or absence of audio in an input signal, a first noise spectrum estimation process for estimating a noise spectrum contained in the input signal based on the input signal and detection result of the audio detection process, thereby obtaining a first noise spectrum estimation value, a second noise spectrum estimation process for estimating the noise spectrum based on the input signal regardless of the detection result of the audio detection process, thereby obtaining a second noise spectrum estimation value, a noise spectrum calculation process for calculating a final noise spectrum estimation value according to a length of detecting time during which the audio is continuously detected in the audio detection process and based on the first and second noise spectrum estimation values that are obtained as estimation results in the first and second noise spectrum estimation processes, a gain calculation process for calculating a noise suppression gain based on the final noise spectrum estimation value, and a noise suppression process for suppressing noise contained in the input signal by applying the noise suppression gain to the input signal.

It is apparent that the invention can achieve advantages that are not essentially different from the advantages described above in association with the noise suppression device according to the invention.

In the noise suppression method according to the invention, the noise spectrum calculation process may include a factor calculation process for calculating a weighting factor by which the first and second noise spectrum estimation values are to be multiplied, the weighting factor having a value varying according to the length of detecting time, and, the noise spectrum calculation process may calculates the final noise spectrum estimation value by calculating a weighted average of the first and second noise spectrum estimation values using the weighting factor.

DETAILED DESCRIPTION OF THE INVENTION

More detailed aspects of the invention and advantages thereof will be apparent from the following description of the embodiments.

First Embodiment

A first embodiment of the invention is described below with reference to FIGS. 1 and 2. The ratio of dimensions of some portions in each of the figures referenced below including FIGS. 1 and 2, for example, in a graph of FIG. 4, may be appropriately changed from that of actual ones.

Figure 1:
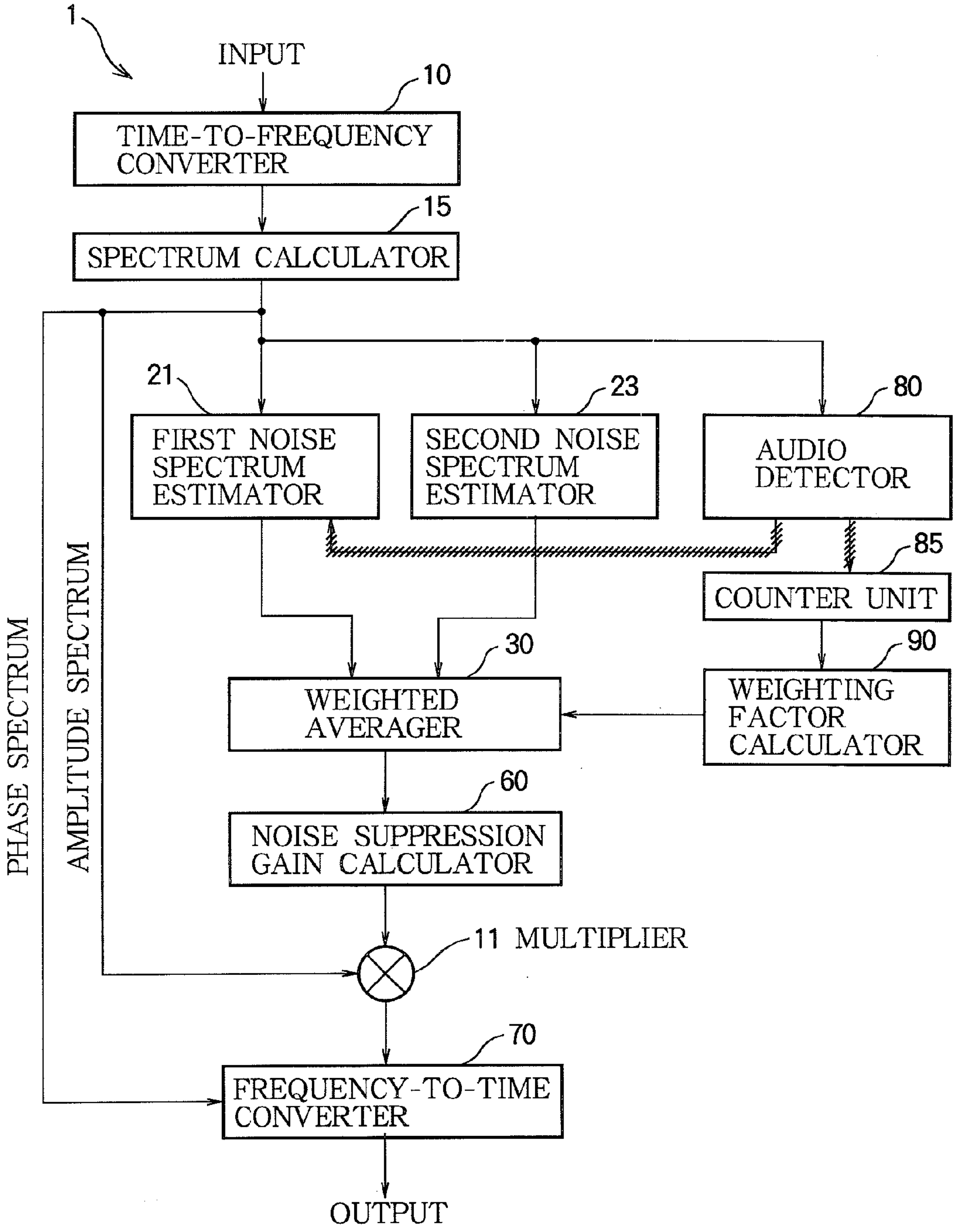
FIG. 1 is a block diagram illustrating a configuration of a noise suppression device according to a first embodiment of the invention.

As shown in FIG. 1, a noise suppression device 1 includes a time-to-frequency converter 10, a spectrum calculator 15, a first noise spectrum estimator 21, a second noise spectrum estimator 23, a weighted averager 30, a noise suppression gain calculator 60, a frequency-to-time converter 70, an audio detector 80, a counter unit 85, and a weighting factor calculator 90.

The time-to-frequency converter 10 performs Fourier transformation on an input signal in the time domain to convert the input signal into a frequency-domain signal. It is preferable that this Fourier transformation be performed by temporally dividing the input signal into a predetermined number of frames and multiplying each of the frames by an appropriate window.

The spectrum calculator 15 calculates an amplitude spectrum, a phase spectrum, and a power spectrum into which the frequency-domain signal is divided. In the first embodiment, especially, the power spectrum is calculated based on the following Equation (1).

$$P(n)=Y_r^2(n)+Y_i^2(n) \tag{1}$$

Here, P(n) is a power spectrum of the input signal, $Y_r(n)$ is a real part of a value obtained through Fourier transformation of the input signal, $Y_i(n)$ is an imaginary part of the value obtained through Fourier transformation of the input signal, and n is a frequency band. Specifically, n is a number assigned to each of N frequency bands into which the frequency domain is divided.

The audio detector 80 is an audio detection means that detects presence or absence of an audio signal in the input signal. When the input signal is divided into frames as described above, audio detection is performed on each frame. In the first embodiment, it is assumed that this audio detection process is performed. Here, the term "audio" especially refers to a sound meaningful to humans such as a talk, a speech, a musical sound, or various signals. That is, it can be considered that such a sound is generated by reproducing an "audio" signal contained in the input signal when the input signal is reproduced using an appropriate playback means. However, the first embodiment takes into consideration the case where a signal that is actually noise is recognized as “audio” in this context. Details of this point will be apparent from a later description.

This audio signal is detected using the following

Equation (2)

$$SNR = 10\log\left(\frac{PS}{PN}\right) \tag{2}$$

PS and PN in Equation (2) are expressed by the following Equations (3) and (4), respectively.

$$PS = \sum_{n=N1}^{N2} P(n) \tag{3}$$

$$PN = \sum_{n=N1}^{N2} N_{t-1}(n) \tag{4}$$

Here, N1 and N2 are frequency band numbers and are thus integers smaller than N described above. P(n) is a power spectrum of the input signal (see Equation (1)) and $N_{t-1}(n)$ is a power spectrum of noise that was estimated through processing of one time point prior to the current time point.

Accordingly, PS is a total power spectrum of the input signal from the band N1 to the band N2 and, similarly, PN is a total noise power spectrum estimated from the band N1 to the band N2. From the above Equations (3) and (4), it can be seen that the SNR of Equation (2) represents a level difference between the total power spectrum of the input signal and the estimated total noise power spectrum.

For example, the audio detector 80 determines that the input signal is audio when the SNR calculated by Equation 2 is equal to or greater than, for example, a predetermined value TH1 (i.e., SNR≧TH1) and determines that the input signal is not audio when the calculated SNR is less than the predetermined value TH1 (i.e., SNR<TH1). The predetermined value TH1 is a threshold for audio detection. Specifically, the predetermined value TH1 is set to, for example, 6 [dB].

The audio detector 80 maintains information indicating presence or absence of an audio signal obtained through such determination. For example, the audio detector 80 holds an audio detection flag sp_flg that is set to a value of 1 or 0 according to presence or absence of an audio signal (which indicates “presence of an audio signal” when sp_flg=1 and “absence of an audio signal” when sp_flg=0). This allows the audio detector 80 to always know whether or not an audio signal is contained in the input signal during the processing of the current time point.

The first noise spectrum estimator 21 is a first noise spectrum estimation means that estimates the first noise spectrum based on the input signal. In the first embodiment, especially, the first noise spectrum is calculated based on the following Equation (5).

$$N1_t(n) = \begin{cases} \mu N_{t-1}(n) + (1-\mu)P(n); & \text{case}\cdot A \\ N_{t-1}(n); & \text{case}\cdot B \end{cases} \tag{5}$$

Here, $\mathbf{N1}_t(n)$ is a first noise spectrum estimation value of a frame that is currently being processed, $N_{t-1}(n)$ is a noise spectrum estimation value of a frame that has been immediately previously processed (such that “t” is a suffix representing the frame that is currently being processed), and μ is a smoothing factor. In Equation (5), case•A represents the case where the flag sp_flg=0 (i.e., where the input signal is not audio at the current time point) and case•B represents the case where the flag sp_flg=1 (i.e., where the input signal is audio at the current time point).

In this manner, the first noise spectrum estimator 21 changes an equation used to obtain the first noise spectrum estimation value $\mathbf{N1}_t(n)$ according to whether or not the audio detector 80 has detected an audio signal at the current time point. That is, the first noise spectrum estimator 21 obtains the first noise spectrum estimation value $\mathbf{N1}_t(n)$ using the immediately previous noise spectrum estimation value $N_{t-1}(n)$ without change when sp_flg=1 and obtains the first noise spectrum estimation value $\mathbf{N1}_t(n)$ by smoothing the input power spectrum in the time axis when sp_flg=0.

The second noise spectrum estimator 23 is a second noise spectrum estimation means that estimates the second noise spectrum based on the input signal. In the first embodiment, especially, the second noise spectrum is calculated based on the following Equations (6) and (7).

$$PA_t(n) = \alpha PA_{t-1}(n) + (1-\alpha)P(n) \tag{6}$$

$$N2_t(n) = \begin{cases} \gamma N2_{t-1}(n) + \dfrac{1-\gamma}{1-\beta}(PA_t(n) - \beta PA_{t-1}(n)); & \text{case}\cdot C \\ PA_t(n); & \text{case}\cdot D \end{cases} \tag{7}$$

Here, $PA_t(n)$ is a smoothed power spectrum of the frame that is currently being processed, $PA_{t-1}(n)$ is a smoothed power spectrum of the immediately previous frame, and α is a smoothing factor.

$\mathbf{N2}_t(n)$ is a second noise spectrum estimation value of the frame that is currently being processed, $\mathbf{N2}_{t-1}(n)$ is a second noise spectrum estimation value of the frame that has been immediately previously processed, and γ and β are control parameters. In Equation (7), case•C represents the case where $PA_t(n)>\mathbf{N2}_{t-1}(n)$ is satisfied and case•D represents the case where $PA_t(n)>\mathbf{N2}_{t-1}(n)$ is not satisfied.

In this case, a combination of the equation represented as case•D of Equation (7) and Equation (6) is substantially identical to the equation represented as case•A of the above Equation (5).

On the other hand, the equation represented as case•C of Equation (7) has no corresponding case in the above Equation (5). However, since this equation is activated when $PA_t(n)>\mathbf{N2}_{t-1}(n)$ is satisfied as described above, i.e., when the power spectrum of the currently processed frame exceeds the second noise spectrum estimation value in the immediately previous frame, it is also possible to consider that the case•C “implies” the possibility that the currently processed frame includes an audio signal. This possibility will be increased if such a condition is satisfied for many bands (n=0, 1, 2, 3, . . . ). However, this possibility is merely an “implication”.

These Equations (6) and (7) have a commonality with the above Equation (5) in this context.

One important feature of Equations (6) and (7), compared to Equation (5), is that it is possible to calculate the noise spectrum estimation value without requiring the results of audio detection, unlike Equation (5). This will be discussed again later.

As represented by the following equation, the weighted averager 30 is a noise suppression means that obtains a weighted average of the estimation values using the first noise spectrum estimation value $N1_t(n)$, the second noise spectrum estimation value $N2_t(n)$, and a weighting factor that is calculated by the weighting factor calculator 90 as described later.

$$N_t(n)=w\cdot N1_t(n)+(1-w)N2_t(n) \quad (8)$$

This weighted average $N_t$ is a noise spectrum estimation value to be finally applied.

The counter unit 85 counts the number of times audio is detected by the audio detector 80 for each frame. That is, the counter unit 85 uses a variable that increases by 1 each time the audio detection flag sp_flg becomes 1. When this variable is denoted by CNT, CNT=CNT+1 when sp_flg=1 and CNT=0 when sp_flg=0. Accordingly, the counter unit 85 provides the duration of audio detection.

The weighting factor calculator 90 calculates a weighting factor w that is used for calculation of the weighted averager 30. In the first embodiment, especially, the weighting factor calculator 90 calculates the weighting factor w based on the following Equation (9).

$$w=\begin{cases}1; & \text{case}\cdot E\\ \dfrac{CNT-TH3}{TH2-TH3}; & \text{case}\cdot F\\ 0; & \text{case}\cdot G\end{cases} \quad (9)$$

Here, TH2 is a lower weighting factor adjustment limit and TH3 is an upper weighting factor adjustment limit. In Equation (9), case•E represents the case where CNT≦TH2, case•F represents the case where TH2<CNT<TH3, and case•G represents the case where CNT≧TH3. The values TH2 and TH3 are called "lower weighting factor adjustment limit" and "upper weighting factor adjustment limit", respectively, since the equation represented as case•F of Equation (9) is active when TH2<CNT<TH3.

Figure 2:
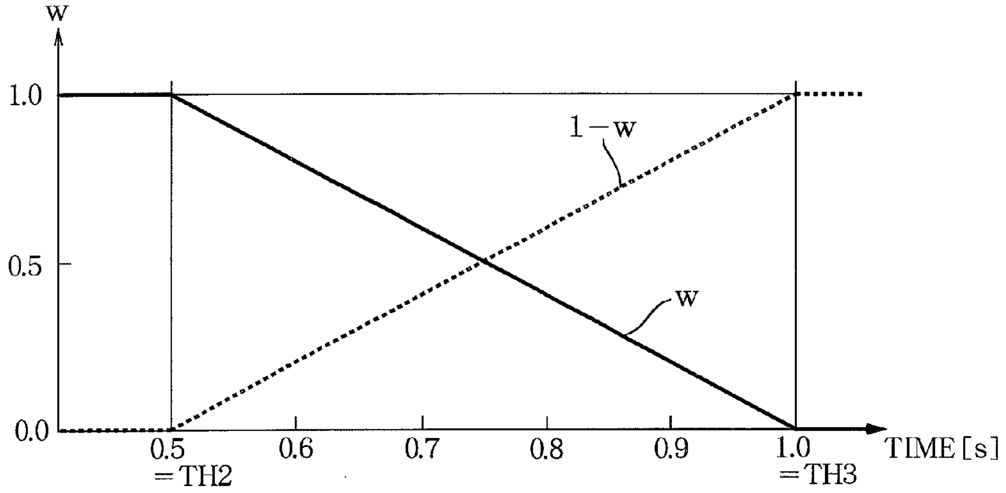
FIG. 2 is a graph of a weighting factor w obtained at a noise suppression gain calculator shown in FIG. 1.

The weighting factor w calculated through Equation (9) is expressed, for example, by a graph as shown in FIG. 2. In FIG. 2, TH2 is shown as corresponding to a point of 0.5 [s] on the horizontal time axis although TH2 originally represents the number of times and TH3 is also shown as corresponding to a point of 1.0 [s] on the horizontal time axis. Although CNT represents the number of times audio is continuously detected by the audio detector 80 as described above, it is possible uniquely determine a time length corresponding to the CNT value. In any case, CNT and TH2 or TH3 can be compared in the same dimension (the same "number of times" or "time").

Accordingly, the weighting factor w shown in FIG. 2 decreases as the time increases from the point of 0.5 [s], i.e., as the variable CNT increases. The adjustment time limit of the weighting factor w is shown as 1.0 [s] (case•F of Equation (9)). w=1.0 (case•E of Equation (9)) when CNT represents a time less than or equal to 0.5 [s] and w=0 (case•G of Equation (9)) when CNT represents a time equal to or greater than 1.0 [s]. In FIG. 2, change of 1−w as the weighting factor w changes is also shown by a dotted line.

As a result, it can be seen from this description and the expression of the above Equation (8) that the weighting factor calculator 90 determines a weighting factor w for reducing influence of the first noise spectrum estimation value $N1_t(n)$ and increasing influence of the second noise spectrum estimation value $N2_t(n)$ as CNT increases.

The noise suppression gain calculator 60 is a gain calculation means that calculates a noise suppression gain based on the amplitude spectrum and the noise spectrum estimation value $N_t(n)$ obtained using Equation (8). In the first embodiment, especially, the noise suppression gain is calculated using the following Equation (10).

$$G(n)=\max\left(0,\ \frac{Y(n)-N_t(n)}{Y(n)}\right) \quad (10)$$

Here, max(a,b) denotes a function that outputs the larger of a and b.

According to this Equation (10), G(n)=0 when the relation between the input amplitude-spectrum Y(n) and the noise spectrum estimation value $N_t(n)$ is that $Y(n)<N_t(n)$ and $G(n)=(Y(n)-N_t(n))/Y(n)$ when $Y(n)>N_t(n)$.

The multiplier 11 shown in FIG. 1 is a noise suppression means that multiplies the amplitude spectrum Y(n) by the noise suppression gain G(n) obtained as described above. That is, the multiplier 11 performs a calculation of $S(n)=G(n)\cdot Y(n)$ to obtain a noise-suppressed amplitude spectrum S(n) that is a value to be finally obtained.

Finally, the frequency-to-time converter 70 generates a time domain output signal based on the noise-suppressed amplitude spectrum S(n) obtained as described above and the phase spectrum provided directly from the time-to-frequency converter 10. In the first embodiment, the frequency-to-time converter 70 performs inverse Fourier transformation since Fourier transformation has been performed by the time-to-frequency converter 10.

The operations and advantages of the noise suppression device 1 associated with the first embodiment described above will now be described with reference to FIGS. 3 to 8 in addition to FIGS. 1 and 2 which have been referenced above.

Figure 3:
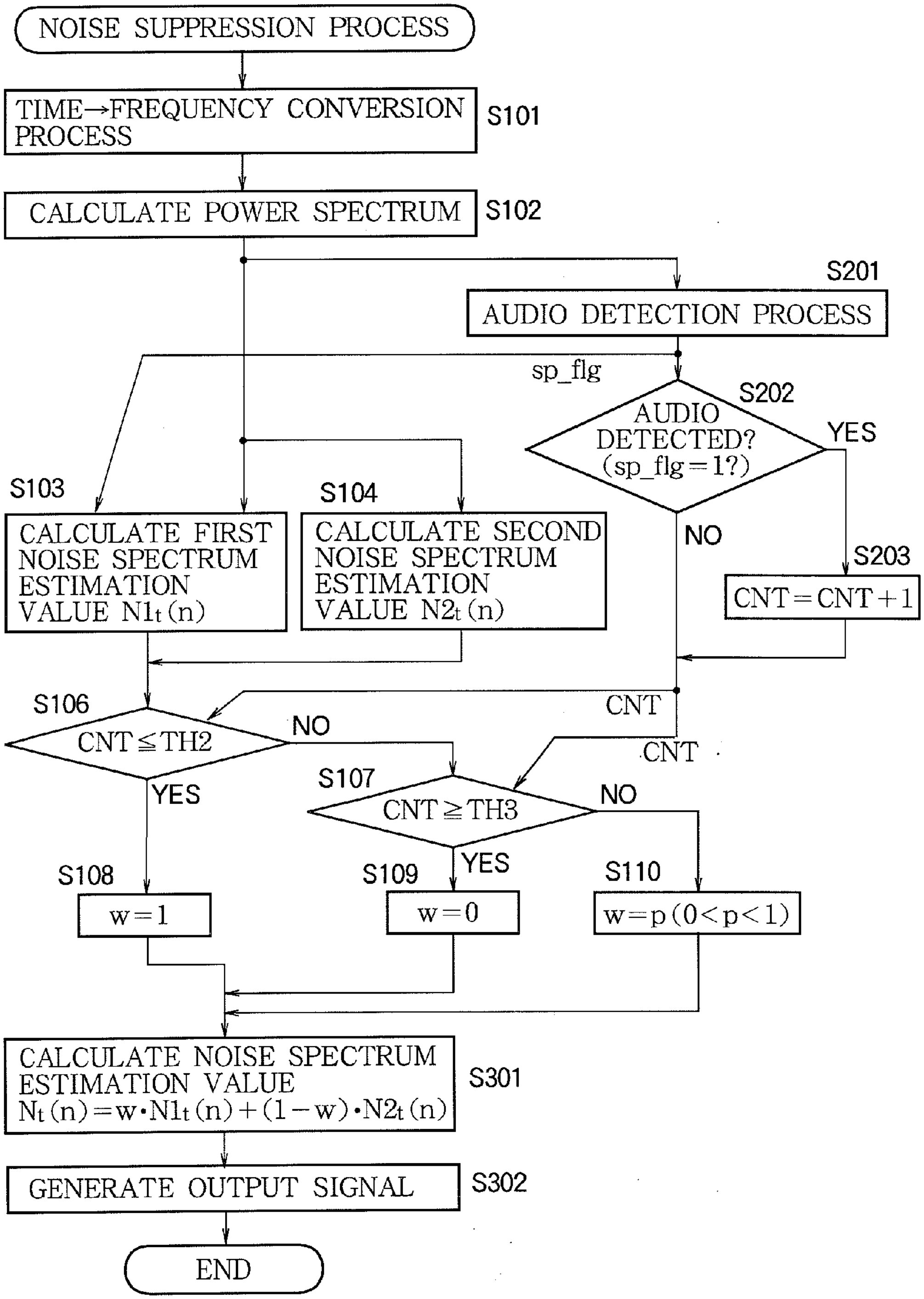
FIG. 3 is a flow chart illustrating a noise suppression procedure according to the first embodiment.

First, the time-to-frequency converter 10 performs Fourier transformation on an input signal to convert the input signal into a frequency domain signal (step S101 in FIG. 3). Here, the time-to-frequency converter 10 performs processing on each frame as described above. The spectrum calculator 15 then calculates a power spectrum P(n) according to the above Equation (1) (step S102 in FIG. 3).

The audio detector 80 then determines whether or not an audio signal is contained in the input signal based on the obtained power spectrum P(n) and Equations (2) to (4) (step S201 in FIG. 3).

In this case, N1 and N2 in Equations (3) and (4) can be appropriately set for purposes, for example the purpose of increasing the accuracy of audio detection. That is, when it is predicted that a frequency band which may include an audio signal is limited within specific bands, it is more reasonable that presence or absence of an audio signal be determined by setting N1 and N2 so as to cover the specific bands than that presence or absence of an audio signal be determined for all frequency bands. In this case, it is possible to achieve advantages such as an increase in the accuracy of audio detection and an increase in the speed of calculation. However, N1 and N2 may also be set so as to cover all frequency bands.

It is determined whether or not an audio signal is contained between the bands N1 and N2 in the above manner and the audio detection flag sp_flg is set (i.e., sp_flg=1) when it is determined that an audio signal is contained and the audio detection flag sp_flg is reset (i.e., sp_flg=0) when it is determined that an audio signal is not contained.

The counter unit 85 continues increasing the variable CNT as long as it is satisfied that sp_flg=1 in the audio detection operation of the audio detector 80 (see steps S202 and S203 in FIG. 3).

In parallel to the audio detection process as described above, the noise suppression device 1 calculates a first noise spectrum estimation value $N1_t(n)$ and a second noise spectrum estimation value $N2_t(n)$ through the first noise spectrum estimator 21 and the second noise spectrum estimator 23 (steps S103 and S104 in FIG. 3).

First, the first noise spectrum estimator 21 calculates the first noise spectrum estimation value $N1_t(n)$ based on the above Equation (5). This calculation process varies according to the value of sp_flg as described above. That is, when it is satisfied that sp_flg=0, the first noise spectrum estimator 21 calculates the first noise spectrum estimation value $N1_t(n)$ by performing a smoothing process in the time axis using the equation represented as case•A of Equation (5). On the other hand, when it is satisfied that sp_flg=1, the first noise spectrum estimator 21 determines that the first noise spectrum estimation value $N1_t(n)$ of the current frame is equal to the noise spectrum estimation value $N_{t-1}(n)$ of the previous frame according to the equation represented as case•B of Equation (5).

In addition, the second noise spectrum estimator 23 calculates the second noise spectrum estimation value $N2_t(n)$ based on the above Equations (6) and (7). This calculation process varies according to whether a power spectrum $PA_t(n)$ of the frame, which is being currently processed and has been subjected to the smoothing process as described above, is greater or smaller than the second noise spectrum estimation value $N2_{t-1}(n)$ of the previously processed frame. That is, the second noise spectrum estimator 23 obtains the second noise spectrum estimation value $N2_t(n)$ using the equation represented as case•C of Equation (7) when it is satisfied that $PA_t(n)>N2_{t-1}(n)$ and using the equation represented as case•D of Equation (7) when it is satisfied that $PA_t(n)\leqq N2_{t-1}(n)$.

Figure 4:
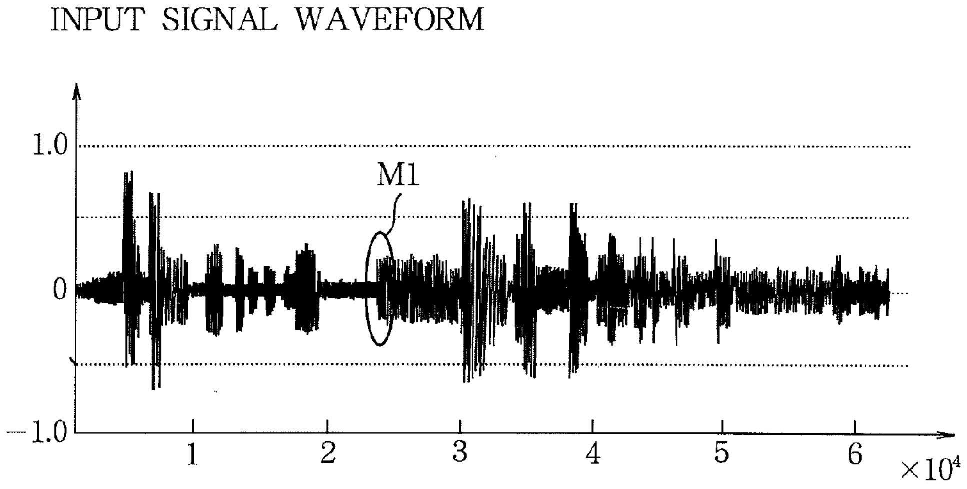
FIG. 4 is a graph illustrating an example waveform of an input signal.
Figure 5:
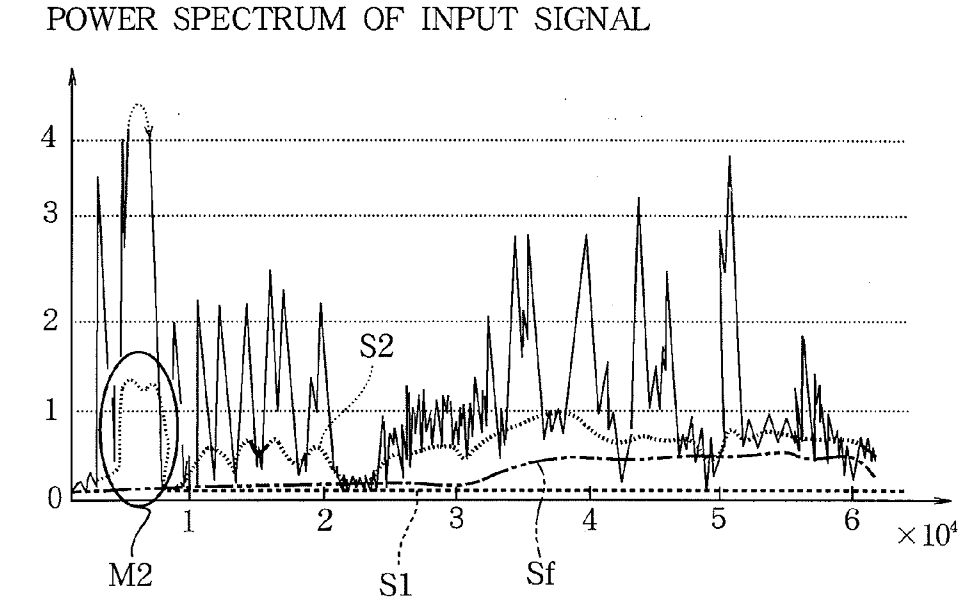
FIG. 5 is a graph illustrating an example calculated power spectrum of an input signal.
Figure 6:
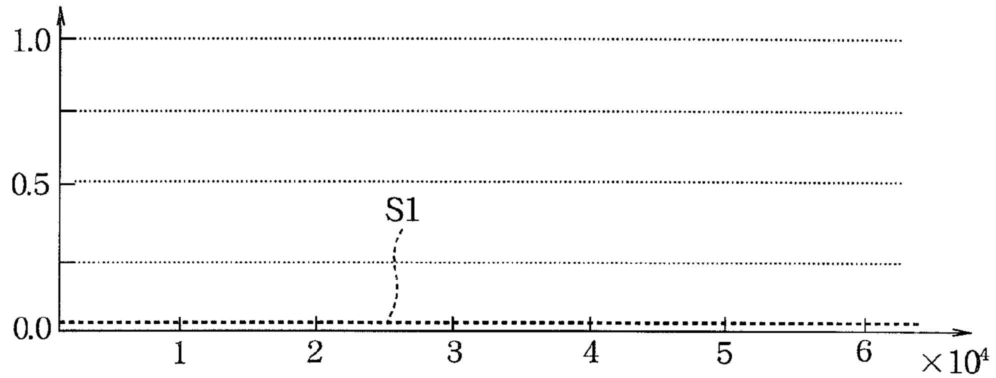
FIG. 6 is a graph illustrating only a curve S1 (first noise spectrum estimation value $N1_t(n)$) in FIG. 5.
Figure 7:
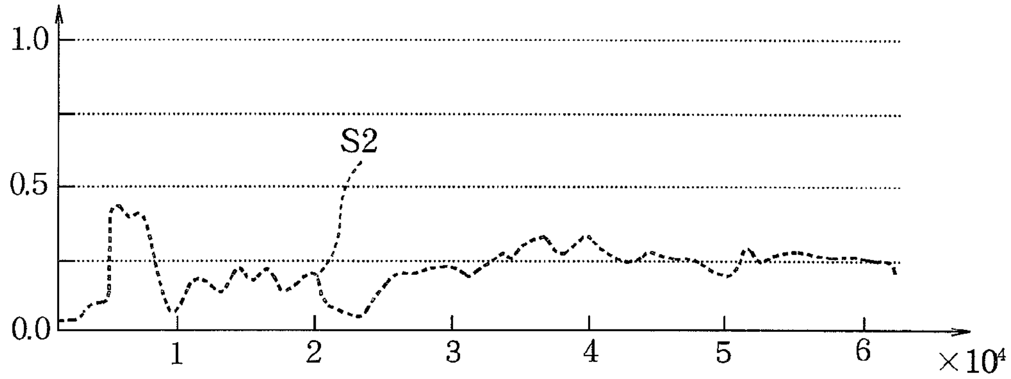
FIG. 7 is a graph illustrating only a curve S2 (second noise spectrum estimation value $N2_t(n)$) in FIG. 5.
Figure 8:
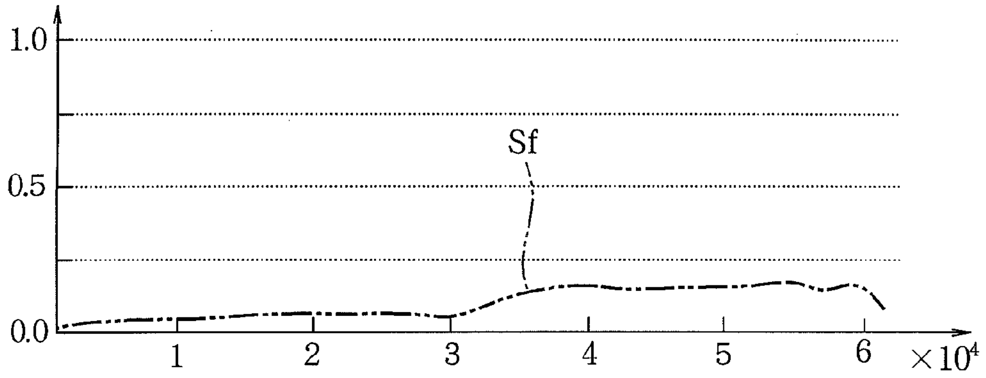
FIG. 8 is a graph illustrating only a curve Sf (final noise spectrum estimation value $N_t(n)$) in FIG. 5.

The first and second noise spectrum estimation values $N1_t(n)$ and $N2_t(n)$ calculated in the above manner are represented, for example, as shown in FIGS. 4 and 5.

FIG. 4 illustrates an example input signal waveform and FIG. 5 illustrates an example power spectrum calculated based on the input signal shown in FIG. 4. That is, FIG. 4 illustrates a "live" signal and FIG. 5 illustrates the power spectrum P(n) after the calculation according to Equation (1) (or after the processing of step S102 in FIG. 3). FIG. 5 especially illustrates a frequency band around a frequency of 250 [Hz]. A dotted arrow line shown at the left upper side of FIG. 5 indicates omission of illustration of an increase in the level exceeding the display limit.

In the example of FIGS. 4 and 5, the first noise spectrum estimation value $N1_t(n)$ is shown by a curve S1 in FIG. 5 and the second noise spectrum estimation value $N2_t(n)$ is shown by a curve S2. In this case, two points should be noted.

The first point to be noted is that, although a portion with a suddenly changing noise signal level is present as shown by a symbol M1 in FIG. 4 (which will be referred to as a "noise level sudden change portion M1"), the first noise spectrum estimation value $N1_t(n)$ or the curve S1 does not exhibit behaviors following the noise level sudden change portion M1. This is the result of using the equation represented as case•B in Equation (5).

Originally, this equation is defined to be activated when sp_flg=1, i.e., when audio is present. However, when the audio detection method based on the above equations (2) to (4) or the audio detector 80 is applied, it is not possible to exclude the possibility that it is erroneously recognized that an audio signal is present at a point at which the level of a noise signal has been rapidly changed as in the noise level sudden change portion M1 in FIG. 4. Because of this, the curve S1 has the form shown in FIG. 5. That is, the first noise spectrum estimation value $N1_t(n)$ is maintained at the previous noise spectrum estimation value $N_t(n)$ since the noise level sudden change portion M1 is erroneously identified as an audio signal and does not follow the level of the noise level sudden change portion M1 although it is a noise signal to be suppressed.

The following is the second point to be noted. The second noise spectrum estimation value $N2_t(n)$ is free from the problem of the first noise spectrum estimation value $N1_t(n)$ described above and satisfactorily (i.e., closely) follows changes in the power spectrum P(n) as shown in FIG. 5. However, for example, the value of the second noise spectrum estimation value $N2_t(n)$ estimated for a part where an audio signal denoted by a symbol M2 is present in FIG. 5 (which will be referred to as an "audio signal part M2") is slightly excessive.

These results are all caused by inherent features of the above Equations (6) and (7). That is, since the second noise spectrum estimation value $N2_t(n)$ is obtained based on a calculation principle that does not require audio detection results and the calculation is based almost entirely upon the power spectrum P(n), the second noise spectrum estimation value $N2_t(n)$ has a risk that it may be overestimated by the value of the power spectrum P(n) although the second noise spectrum estimation value $N2_t(n)$ satisfactorily follows changes in the power spectrum P(n).

If the noise suppression process is performed on the audio signal portion M2 while using the overestimated second noise spectrum estimation value $N2_t(n)$ without change, noise is suppressed more than necessary, which may cause degradation of sound quality.

After the first and second noise spectrum estimation values $N_1t(n)$ and $N_2t(n)$ are obtained as described above, a weighting factor w is set according to the value of the variable CNT (see steps S106 to S110 in FIG. 3). Specifically, the weighting factor calculator 90 in FIG. 1 sets the weighting factor w to 1 (i.e., w=1) when CNT is equal to or less than the weighting factor adjustment lower limit TH2 (step S108 in FIG. 3) and sets the weighting factor w to 0 (i.e., w=0) when CNT is equal to or greater than the weighting factor adjustment upper limit TH3 (step S109 in FIG. 3). In other cases, i.e., when it is satisfied that TH2<CNT<TH3, the weighting factor calculator 90 sets the weighting factor w to p (i.e., w=p) (step S110 in FIG. 3). Here, "p" corresponds to the right-hand side of the equation represented as case•F of Equation (9) described above and is determined, for example, according to the method of FIG. 2.

The weighted averager 30 obtains a noise spectrum estimation value $N_t(n)$ according to the weighting factor w and Equation (8) described above (step S301 in FIG. 3).

In this case, one important point is that, since the weighting factor w is determined according to the magnitude of the CNT value, the noise spectrum estimation value $N_t(n)$ is also determined according to the magnitude of the CNT value. That is, the noise spectrum estimation value $N_t(n)$ is equal to the value of the first noise spectrum estimation value $N1_t(n)$ when CNT is small, i.e., when the audio duration is not very long, and is equal to the value of the second noise spectrum estimation value $N2_t(n)$ when CNT is great, i.e., when the audio duration is very long.

When CNT is intermediate, the noise spectrum estimation value $N_t(n)$ is equal to a value obtained by appropriately combining the first and second noise spectrum estimation values $N_1t$ (n) and $N_2t(n)$. In this case, as the CNT value increases, the influence of the first noise spectrum estimation value $N1_t(n)$ upon determining the noise spectrum estimation value $N_t(n)$ decreases while the influence of the second noise spectrum estimation value $N2_t(n)$ increases.

The noise spectrum estimation value $N_t(n)$ to be finally applied, which is obtained by performing the procedure described above, is represented in FIG. 5 referenced above. Specifically, in FIG. 5, the noise spectrum estimation value $N_t(n)$ is shown by a curve Sf. Since the noise spectrum estimation value $N_t(n)$ or the curve Sf has undergone the weighted averaging process described above, no excessive spectrum value is estimated in the audio signal portion M2 while the property of following changes in the power spectrum P(n) is maintained to some extent as shown in FIG. 5. To allow the curves S1, S2, and Sf to be easily viewed in FIG. 5, the curves S1, S2, and Sf are separately shown in FIGS. 6 to 8, respectively.

Finally, the noise suppression gain calculator 60 calculates the noise suppression gain G(n) using the obtained noise spectrum estimation value $N_t(n)$ according to the above Equation (10). Then, the noise suppression gain G(n) is multiplied by the original amplitude spectrum Y(n) (through the multiplier 11 shown in FIG. 1) to calculate the noise-suppressed amplitude spectrum S(n) (step S302 in FIG. 3).

The noise suppression device 1, which has the configurations and operations described above, has the following advantages.

(1) According to the noise suppression device 1 of the first embodiment, the noise spectrum estimation value $N_t(n)$ more accurately reflects a noise spectrum that would be contained in an input signal in the real world so that noise in the input signal is suppressed very appropriately. This is because setting of the noise spectrum estimation value $N_t(n)$ is performed according to the magnitude of CNT as described above.

Generally, the possibility that an audio signal is contained in an input signal during a very long time is very small. This estimation has a reasonable basis, for example, since, in the case where persons converse with each other, mute intervals are often included in scenes such as speaker switching or since breathing or the like is necessary during speaking even when a single person speaks continuously.

Thus, it is unnatural that CNT has a very large value. Therefore, when CNT is increasing, it is highly likely that a scene (or section) which should not be determined to be an audio signal has been present, i.e., that a noise signal has been erroneously recognized as an audio signal.

This circumstance is taken into consideration in the procedure from "YES" at step S107 to step S109 in FIG. 3. Specifically, in the case where CNT exceeds the predetermined value TH3, the weighting factor w is set to 0 since the problematic situation described above is highly likely to occur. That is, in this case, the result of audio detection is "ignored" by setting the noise spectrum estimation value $N_t(n)$ to be equal to the second noise spectrum estimation value $N2_t(n)$ according to Equation (8) or the method of FIG. 2. Accordingly, a noise suppression process is performed according to the second noise spectrum estimation value $N2_t(n)$ that satisfactorily follows the power spectrum P(n), thereby enabling an appropriate measure against the noise signal (i.e., effective suppression of the noise signal).

While this procedure serves as an appropriate measure against the abnormal situation, the procedure from "YES" at step S106 to step S108 in FIG. 3 (i.e., the procedure for setting the weighting factor w to 1) serves as a "normal procedure" in the same context. Actually, the estimation of the noise spectrum using the audio detection result has higher reliability than estimation without using the audio detection result. In addition, in the first embodiment, the method of determining the value of the first noise spectrum estimation value $N1_t(n)$ is different according to the presence or absence of an audio signal as represented in Equation (5) and a respective appropriate noise suppression procedure is also performed according to the presence or absence of an audio signal, thereby increasing the possibility that more effective noise suppression is achieved. Accordingly, it is reasonable that this procedure be recognized as a "normal procedure". Of course, the term "abnormal" or "normal" is associated only with the presence or absence of "the possibility of erroneous detection of audio" and does not imply any other important situation.

(2) On the other hand, the procedure from "NO" at step S107 to step S110 in FIG. 3 serves as a procedure applied for an intermediate case of the above two cases as is apparent from comparison with the above description. That is, according to the first embodiment, a "compromise" procedure of the procedures of the above two cases is performed for a region which has a value with a possibility of erroneous recognition from the above viewpoint although CNT is not very great. In addition, in the first embodiment, a specific intermediate noise spectrum estimation value automatically obtained for the region is not equally used in such a case but instead the weighting factor w is adjusted according to the value of CNT (see FIG. 2) and an attempt to calculate the noise spectrum estimation value $N_t(n)$ is made each time the weighting factor w is adjusted.

This processing method is a more practical measure since it is free from drastic processing change and is also very effective since the two advantages described above, i.e., suppression of noise having a rapidly changed level and avoidance of sound quality degradation by avoiding overestimation of the noise spectrum, are achieved in a balanced manner. This is one significant advantage of the first embodiment.

Second Embodiment

Figure 9:
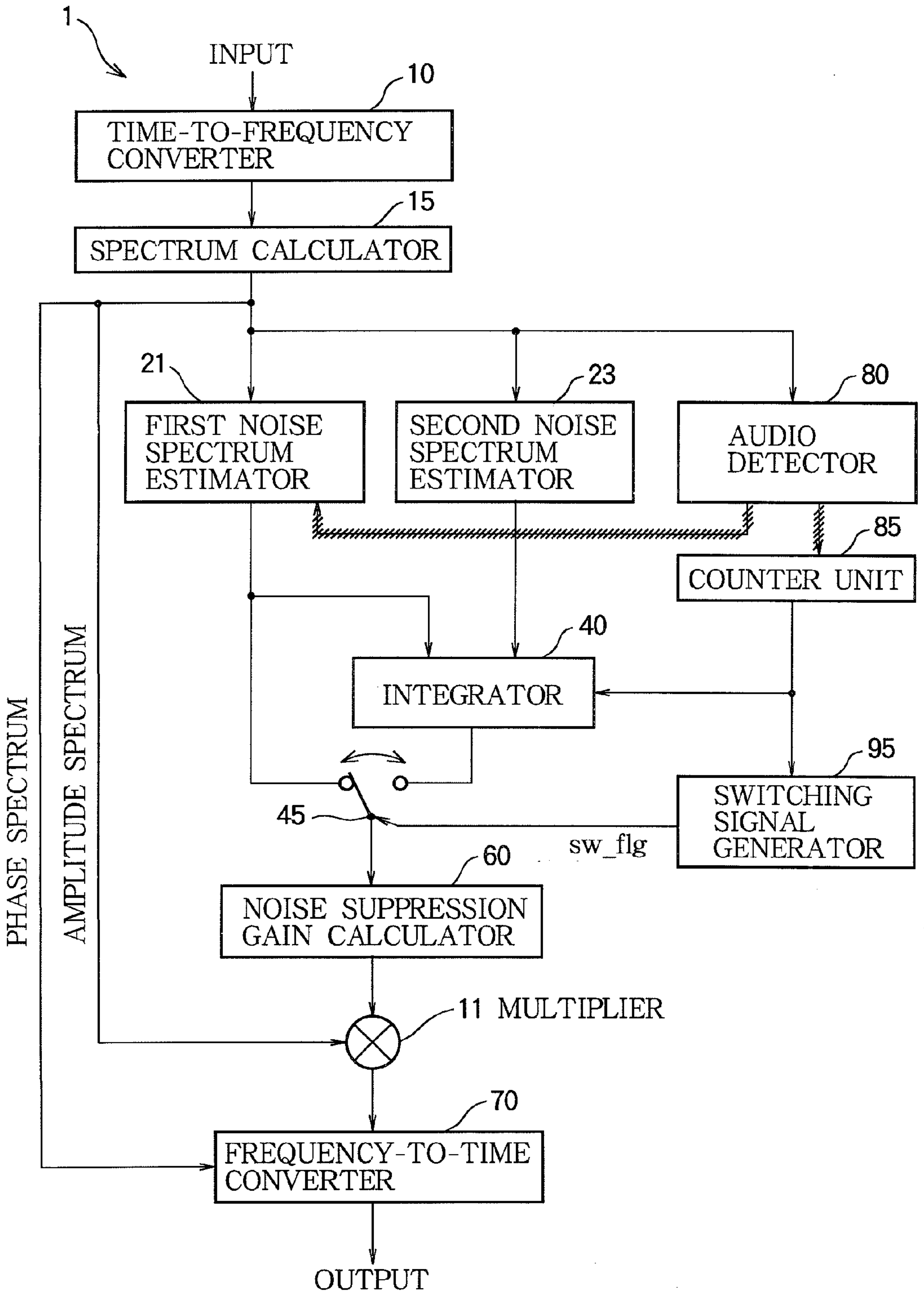
FIG. 9 is a block diagram illustrating a configuration of a noise suppression device according to a second embodiment of the invention.

A second embodiment of the invention is described below with reference to FIG. 9. The second embodiment has different features, associated with the process for mixing the first and second noise spectrum estimation values $N1_t(n)$ and $N2_t(n)$, from the first embodiment. Other features of the second embodiment are all identical to those of the first embodiment unless otherwise noted. Thus, the following description will be given focusing on the different features and other features will be simply described or will not be described. In FIG. 9, elements other than those associated with the different features are also denoted by the same reference numerals as those of the first embodiment.

A noise suppression device 1' of the second embodiment includes an integrator 40, a switch 45, and a switching signal generator 95 as shown in FIG. 9. The switching signal generator 95 generates a switching signal sw_flg for controlling the switch 45. The switching signal sw_flg is generated according to an input from the counter unit 85 as shown in FIG. 1. That is, the switching signal generator 95 generates or does not generate the switching signal sw_flg based on the CNT value representing the duration of audio detection. Preferably, it is possible to set a criterion that the switching signal sw_flg be generated, for example, when CNT≧TH4 (i.e., sw_flg=1) and not be generated when CNT<TH4 (i.e., sw_flg=0). The following description will be given based on this criterion.

Here, it is assumed that the switch 45 is normally connected to the first noise spectrum estimator 21 as shown in FIG. 9 and is switched to the second noise spectrum estimator 23 at the opposite side when the switching signal sw_flg is set to 1 (i.e., sw_flg=1). The switch 45 is connected back to the first noise spectrum estimator 21 when the switching signal sw_flg is set to 0.

The integrator 40 includes, for example, an op amp (operational amplifier), a capacitance element, and a resistance element, all of which are not shown. In the first embodiment, the integrator 40 receives outputs of both the first noise spectrum estimator 21 and the second noise spectrum estimator 23 as shown in FIG. 1. The integrator 40 operates according to the following Equation (11).

$$Ni_t(n) = \begin{cases} N1_t(n); & \text{case}\cdot H \\ \lambda Ni_{t-1}(n) + (1-\lambda)N2_t(n); & \text{case}\cdot I \end{cases} \quad (11)$$

Here, $Ni_t(n)$ is the output of the integrator 40 of the current time point, $Ni_{t-1}(n)$ is the output of the integrator 40 of one time point ago, and λ is a smoothing factor. In Equation (11), case•H represents the case where CNT=TH4 and case•I represents the case where CNT>TH4. Although, in Equation (11), TH4 serves as a threshold based on which it is determined whether or not to activate the integrator 40, TH4 actually serves as the predetermined value TH2 of the first embodiment as will be understood from the following description.

Since $N1_t(n)$ and $N2_t(n)$ in Equation (11) are the first noise spectrum estimation value and the second noise spectrum estimation value as described above, actually, the integrator 40 is activated only in the case of "case•I", i.e., when CNT>TH4 and each value for realizing a smooth connection (or transition) from the first noise spectrum estimation value $N1_t(n)$ to the second noise spectrum estimation value $N2_t(n)$ is output according to an increase of t.

The noise suppression device 1' of the second embodiment as described above operates in the following manner.

First, steps S101 to S104 and steps S201 to S203 in FIG. 3 are identical to corresponding steps of the first embodiment.

The difference is how CNT is used. Namely, in the first embodiment CNT is used to determine the noise spectrum estimation value $N_t(n)$ finally obtained through adjustment of weighting factor w, whereas in the second embodiment CNT provides a reference for activating the integrator 40.

That is, first, when CNT reaches TH4 while sequentially increasing, the switching signal generator 95 sets the switching signal sw_flg to 1. This causes the switch 45 to be switched to the side of the second noise spectrum estimator 23, i.e., to the integrator 40.

At the same time, the integrator 40 activates the equation represented as case•H of Equation (11). Here, outputting $N1_t(n)$ (i.e., $Ni_t(n)=N1_t(n)$) from the integrator 40 is almost identical to causing the integrator 40 to have an initial value.

Thereafter, when CNT continues increasing, the sw_flg remains set to 1 and the switch 45 is kept connected to the integrator 40 so that the integrator 40 activates the equation represented as case•I of Equation (11). Accordingly, after the integrator 40 initially outputs $N1_t(n)$, the integrator 40 sequentially outputs values gradually approaching the second noise spectrum estimation value $N2_t(n)$.

Accordingly, the first noise spectrum estimation value $N1_t(n)$ is input to the noise suppression gain calculator 60 shown in FIG. 9 until CNT reaches TH4 and then the first noise spectrum estimation value $N1_t(n)$ is initially input and the second noise spectrum estimation value $N2_t(n)$ is finally input to the noise suppression gain calculator 60 after CNT reaches TH4. Preferably, it is possible to realize that the second noise spectrum estimation value $N2_t(n)$ is finally input to the noise suppression gain calculator 60, for example, by inputting the second noise spectrum estimation value $N2_t(n)$ to the op amp described above or the like so that the output is saturated at $N2_t(n)$.

As can be seen from this, the threshold TH4 serves as a reference point for switching from the first noise spectrum estimation value $N1_t(n)$ to the second noise spectrum estimation value $N2_t(n)$. From the functional point of view, the threshold TH4 is substantially identical to TH2 of the first embodiment.

In connection with this, the smoothing factor λ of Equation (11) can be set as a value corresponding to, for example, a time constant of 0.5 [s]. As a result, a process that is almost identical to the process "weighting factor adjustment", which is initiated at the time of 0.5 [s] until which audio is continuously detected, described above with reference to FIG. 2, can also be realized in the example of FIG. 9 associated with the second embodiment.

The subsequent procedure is identical to that of the first embodiment. That is, the noise suppression gain calculator 60 calculates the noise suppression gain G(n) according to the above Equation (10). Then, the noise suppression gain G(n) is multiplied by the original amplitude spectrum Y(n) to calculate the noise-suppressed amplitude spectrum S(n) (see step S302 in FIG. 3).

The second embodiment has the following advantages.

First, it is apparent that the second embodiment has operations and advantages substantially identical to those of the first embodiment. Thus, the second embodiment has almost the same advantages as the advantages (1) and (2) described above in association with the first embodiment.

In addition, according to the second embodiment, a smooth connection (or transition) from the first noise spectrum estimation value $N1_t(n)$ to the second noise spectrum estimation value $N2_t(n)$ can be achieved due to use of the integrator 40 and the advantage (2) described above in association with the first embodiment is more effective.

Although the embodiments of the invention have been described above, the noise suppression device according to the invention is not limited to the above embodiments and various modifications are possible.

(1) Although audio detection is performed based on Equations (2) to (4) in the first and second embodiments, the invention is not limited to this detection method.

For example, the invention may employ a method in which audio is detected, simply based on whether or not the level of the input signal exceeds a predetermined threshold. The invention may also employ a method in which the probability of occurrence of an audio signal is estimated using a probabilistic and statistical method. The invention may also employ a method in which a signal before Fourier transformation is used as a detection target, unlike the above embodiments in which the input signal after Fourier transformation is used as a detection target.

(2) Although the weighting factor w linearly increases in the example described in the first embodiment, the invention is not limited to this example. For example, the weighting factor w may nonlinearly increase, i.e., may increase in a curve.

In connection with this, the weighting factor w need not continuously increase. For example, the weighting factor w may also increase in a stepwise manner such that w=0.1, 0.2, . . . .

More generally, when a situation in which CNT exceeds a predetermined value occurs, it is also possible to calculate the noise spectrum estimation value to be a specific value determined based on the first noise spectrum estimation value $N1_t(n)$ and the second noise spectrum estimation value $N2_t(n)$.

(3) Although the noise suppression gain G(n) is calculated using Equation (10) in the first and second embodiments, the invention is not limited to this calculation method. For example, the invention may use other methods such as a Wiener filtering method or a Minimum Mean-Square Error (MMSE) method (see, for example, Lim & Oppenheim, "Enhancement and Bandwidth Compression of Noisy Speech," Proc. IEEE, Vol. 67, No. 12, pp. 1586-1604, 1979 or Y. Ephraim and D. Malah, "Speech Enhancement Using a Minimum Mean-Square Error Short-Time Spectral Amplitude Estimator," IEEE Trans. Vol. ASSP-32, No. 6, pp. 1109-1121, 1984). In addition, a Signal (Audio) to Noise Ratio (SNR) may be estimated and the noise suppression gain G(n) may then be obtained based on the estimated SNR.

What is claimed is:

1. A noise suppression device comprising:
- an audio detector that detects presence or absence of audio in an input signal;
- a counter that measures a length of detecting time during which the audio detector continuously detects the audio;
- a first noise spectrum estimator that estimates a noise spectrum contained in the input signal based on the input signal and detection result of the audio detector, thereby obtaining a first noise spectrum estimation value;
- a second noise spectrum estimator that estimates the noise spectrum based on the input signal regardless of the detection result of the audio detector, thereby obtaining a second noise spectrum estimation value;
- a noise spectrum calculator that calculates a final noise spectrum estimation value according to the length of detecting time of the audio measured by the counter and based on the first and second noise spectrum estimation values that are obtained as estimation results by the first and second noise spectrum estimators;
- a gain calculator that calculates a noise suppression gain based on the final noise spectrum estimation value; and
- a noise suppressor that suppresses noise contained in the input signal by applying the noise suppression gain to the input signal.

2. The noise suppression device according to claim 1, wherein the noise spectrum calculator includes a factor calculation unit that calculates a weighting factor by which the first and second noise spectrum estimation values are to be multiplied, the weighting factor having a value varying according to the length of detecting time, and wherein
- the noise spectrum calculator calculates the final noise spectrum estimation value by calculating a weighted average of the first and second noise spectrum estimation values using the weighting factor.

3. The noise suppression device according to claim 1, wherein the noise spectrum calculator includes an integrator that operates according to the length of detecting time, that uses the first noise spectrum estimation value as an initial value, and that is activated upon receiving the second noise spectrum estimation value.

4. The noise suppression device according to claim 1, wherein the noise spectrum calculator calculates the first noise spectrum estimation value directly as the final noise spectrum estimation value when the length of detecting time is equal to or less than a first predetermined value, calculates the second noise spectrum estimation value directly as the final noise spectrum estimation value when the length of detecting time is equal to or greater than a second predetermined value, and calculates an intermediate noise spectrum estimation value between the first and second noise spectrum estimation values as the final noise spectrum estimation value when the length of detecting time is greater than the first predetermined value and less than the second predetermined value.

5. The noise suppression device according to claim 4, wherein the intermediate noise spectrum estimation value has a value varying according to the length of detecting time so as to transition between the first and second noise spectrum estimation values.

6. The noise suppression device according to claim 1, wherein the audio detector detects presence or absence of audio in the input signal for a part belonging to a predetermined frequency band in the input signal.

7. A noise suppression method comprising:
- an audio detection process, performed by an audio detector, for detecting presence or absence of audio in an input signal;
- a count process, performed by a counter, for measuring a length of detecting time during which the audio detection process continuously detects the audio;
- a first noise spectrum estimation process for estimating a noise spectrum contained in the input signal based on the input signal and the detection result of the audio detection process, thereby obtaining a first noise spectrum estimation value;
- a second noise spectrum estimation process for estimating the noise spectrum based on the input signal regardless of the detection result of the audio detection process, thereby obtaining a second noise spectrum estimation value;
- a noise spectrum calculation process for calculating a final noise spectrum estimation value according to the length of detecting time of the audio measured by the count process and based on the first and second noise spectrum estimation values that are obtained as estimation results in the first and second noise spectrum estimation processes;
- a gain calculation process for calculating a noise suppression gain based on the final noise spectrum estimation value; and
- a noise suppression process for suppressing noise contained in the input signal by applying the noise suppression gain to the input signal.

8. The noise suppression method according to claim 7, wherein the noise spectrum calculation process includes a factor calculation process for calculating a weighting factor by which the first and second noise spectrum estimation values are to be multiplied, the weighting factor having a value varying according to the length of detecting time, and wherein
- the noise spectrum calculation process calculates the final noise spectrum estimation value by calculating a weighted average of the first and second noise spectrum estimation values using the weighting factor.

* * * * *